(12) United States Patent
Marche (10) Patent No.: US 8,096,501 B2
(45) Date of Patent: Jan. 17, 2012

(54) AIRCRAFT NACELLE WHICH INCLUDES THRUST REVERSER SYSTEM AND AIRCRAFT INCORPORATING AT LEAST ONE SUCH NACELLE

(75) Inventor: Jacques Herve Marche, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 385 days.

(21) Appl. No.: 12/490,964

(22) Filed: Jun. 24, 2009

(65) Prior Publication Data

US 2010/0024387 A1 Feb. 4, 2010

(30) Foreign Application Priority Data

Jun. 26, 2008 (FR) ...................... 08 54268

(51) Int. Cl.
*F02K 1/54* (2006.01)
(52) U.S. Cl. ............... 244/110 B; 60/226.2; 239/265.29
(58) Field of Classification Search .............. 244/110 B, 244/129.4; 60/226.1–226.3, 262; 239/265.29
See application file for complete search history.

(56) References Cited

U.S. PATENT DOCUMENTS

| | | | |
|---|---|---|---|
| 3,762,667 A | | 10/1973 | Pender |
| 4,073,440 A | | 2/1978 | Hapke |
| 4,564,160 A | * | 1/1986 | Vermilye .................. 244/110 B |
| 6,065,285 A | * | 5/2000 | Gonidec et al. .............. 60/226.2 |
| 2005/0102996 A1 | * | 5/2005 | Lair ............................. 60/226.2 |
| 2005/0151012 A1 | * | 7/2005 | Lair ........................... 244/110 B |
| 2009/0121078 A1 | | 5/2009 | Marche |

FOREIGN PATENT DOCUMENTS

| | | |
|---|---|---|
| EP | 1 843 031 A1 | 10/2007 |
| FR | 2 757 570 A1 | 6/1998 |
| FR | 2 887 225 A1 | 12/2006 |
| FR | 2 887 854 A1 | 1/2007 |

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

Aircraft nacelle which includes a cowl with a longitudinal axis, an engine housed in the cowl, an annular channel surrounding the engine and designed to receive a secondary flow, wherein the cowl includes a fixed part and a moving part which slides along the longitudinal axis to define a radial opening between the moving and fixed parts, a thrust reverser system which includes internal flaps mounted so that they rotate and which are designed to block the annular channel, at least partially, in the deployed position, where the moving part of the cowl includes a radial housing to receive the internal flaps in the at-rest position and where a system of applying an elastic force on each flap towards deployment is provided. Thus control over the position of the internal flaps is obtained directly by sliding the moving part.

13 Claims, 6 Drawing Sheets

AIRCRAFT NACELLE WHICH INCLUDES THRUST REVERSER SYSTEM AND AIRCRAFT INCORPORATING AT LEAST ONE SUCH NACELLE

TECHNICAL FIELD AND EXISTING TECHNOLOGY

The present invention relates to an aircraft engine nacelle and more specifically to a device used on an aircraft engine nacelle to reduce, cancel or reverse the thrust produced by a propulsion assembly.

An aircraft propulsion assembly includes a motor with, on the one hand, a fan which includes a rotor fitted with blades and a stator fitted with vanes, and on the other hand a primary duct inside which are arranged, in the direction of the air-flow, compressor stages, a combustion chamber and turbine stages. The engine is arranged in a nacelle which includes an air inlet upstream of the fan and a secondary duct downstream of the fan stator.

In general terms, the secondary duct essentially takes the form of an annular channel surrounding the primary duct. The primary duct is linked to the wing by a longitudinal pylon whose purpose is to firmly fix the propulsion assembly to the wing, and which passes through the annular channel and which is linked to the upper part of the primary duct.

In order to reduce unwanted noise levels, certain parts of the secondary duct surfaces are covered to provide acoustic treatment of the surfaces.

A propulsion assembly generally includes a reverse thrust device which is used to divert at least part of the flow in order to reduce, cancel or reverse the thrust produced by the said propulsion assembly by means of one or more moving flaps designed to be placed into the secondary flow in order to divert it.

In document FR 2 887 225 a nacelle equipped with a thrust reverser is known where the nacelle includes a front part and a rear part, separated by an annular radial opening, where the front and rear parts are formed by an internal cowl and an external cowl, and where the internal and external flaps are placed at the radial opening, with the internal flaps being able to move towards the interior of the secondary duct in order to block or at least reduce the secondary flow, and where the external flaps pivot towards the exterior in order to divert the secondary flow in a forwards direction. The internal and external flaps are connected to the front and rear parts of the nacelle, so that these connections reduce the aerodynamic effectiveness of the nacelle. Furthermore, they do not allow for effective noise reduction treatment, since seals are usually fitted at the connections to prevent the escape of the secondary flow with the flaps in the folded position, which further exacerbates the above mentioned drawbacks.

Nacelles are also known which include a fixed front part and a rear part which moves longitudinally to the rear to contrive, between the fixed part and the moving part, a radial opening as well as flaps fitted in the secondary duct, hinged relative to the moving part, which are able to occupy a first deployed position in which they block off, at least partially, the secondary duct, so as to divert the flow of air in the direction of the radial opening, and a second position, folded flat against the surface of the nacelle. Rods are usually provided to operate the flaps, with one end of the rods being linked to the flap, the other to the drive unit.

As stated earlier, these configurations limit the ability to apply coverings for noise reduction treatment of the internal surface of the nacelle. In effect, the connection zones between the fixed part and the moving part, the zones where the hinges for the pivoting components (doors or flaps) are fitted, cannot incorporate coverings for anti-noise treatment purposes. These un-treated areas may represent of the order of 20% of the internal surface of the nacelle.

These configurations also result in aerodynamic losses in the flow passing inside the secondary duct because of the numerous connections between the fixed part and the moving part, and because of the numerous obstacles present in the flow, such as rods for the flaps of the cascade thrust reversers.

These configurations also result in difficulties in adjustment between the fixed part and the moving part because deformation of the moving part varies depending on their position.

The purpose of the present invention is therefore to propose a nacelle whose aerodynamic performance and acoustic qualities are improved in relation to nacelles using existing technology.

PRESENTATION OF THE INVENTION

The above stated aims are achieved by a nacelle which includes a front fixed part, a moving rear part and flaps which are designed to deploy inside the nacelle in the secondary duct, where the moving part includes an annular recess to receive the flaps in the folded position, where sliding the moving part causes the flaps to deploy in the secondary duct, where the deployment and retraction are achieved without remote actuator control, but where an elastic force is applied on the flaps towards a deployed position, so that when the moving part uncovers the flaps, the latter are automatically deployed.

In other terms, the thrust reverser device is deployed to form a crown of petals under the action of an elastic force which permanently forces the petals towards a deployed state when the moving part is moved.

Thus, because of the invention, no hydraulic, electrical or pneumatic actuators are required to operate the movement of the flaps, allowing the nacelle to be made lighter and increasing the operational safety of the reverser. Furthermore, the external surface of the nacelle includes only one connection zone between the moving part and the fixed part, and the wall of the annular duct also only includes one connection formed by this same zone. Thus effective noise reduction treatment may be easily achieved.

Advantageously, a series of flaps is provided which can deploy towards the exterior of the nacelle in order to divert the flow forwards, where these flaps are also released by the retraction of the moving part.

The subject-matter of the present invention is therefore an aircraft nacelle which includes a cowl with a longitudinal axis, an engine housed in the internal space defined by the cowl, an annular channel surrounding the engine and which is designed to receive a secondary flow, where the cowl is made up of a fixed part and a moving part designed to slide along the longitudinal axis in order to define a radial opening between the moving part and the fixed part, a thrust reverser system which includes internal flaps fitted so that they move in rotation and which are designed to have an at-rest position in which the internal flaps are effectively parallel to the longitudinal axis and a deployed position in which the internal flaps obstruct, at least partially, the annular channel, the moving part of the cowl including a radial housing which extends longitudinally to receive the internal flaps in the at-rest position, and means designed to apply an elastic force on each internal flap towards a deployed position being provided, so that control over the position of the flaps is achieved directly by sliding the moving part of the cowl.

The internal flaps have, for example, a trapezoidal shape and are mounted so that they pivot on their long base.

Advantageously, the means for applying elastic force include a spring coiled around an axis of rotation of the internal flaps and supported at each of its ends on the internal flap and on a chassis, so that the system is therefore robust and secure. In addition it has small overall dimensions and there are no protrusions.

The thrust reverser system may be provided as being equipped with means to limit the maximum deployment of each internal flap, made up of a bushing which moves along a rod which extends longitudinally from the fixed part of the cowl through the radial opening and a rod which connects the bush to the internal flap.

Advantageously, the thrust reverser system also includes external grills and/or flaps at the external circumference of the nacelle, where the said deflection grids and/or flaps fit into the radial housing in the at-rest position of the internal flaps. The external flaps are used to divert the flow forwards and improve the effectiveness of the reverse thrust.

Means of applying an elastic force to provide deployment of each external flap may also be provided so that control over the position of the external flaps is achieved directly by sliding the moving part of the cowl and is simultaneous to that for the internal flaps.

Advantageously, the external flaps are trapezoidal in shape, and are fitted so that they rotate at their small base, where the axis of rotation of each of the external flaps is angularly offset relative to the other axes of rotation, so that the axes of rotation are not in a plane that is orthogonal to the longitudinal axis, so that the external flaps may be retracted without any interference between them.

It could be envisaged that the means to limit the maximum deployment of each internal flap includes a second rod connecting the bushing to an external flap, thus also limiting the maximum deployment of each external flap.

In a preferred manner, a first set of rollers could be provided on the mobile part, designed to roll in roller tracks formed in the internal flaps and/or a second set of rollers designed to roll on roller tracks formed in the external flaps could be provided. The set of rollers is used to reduce the risk of jamming occurring between the moving cowl and the internal and/or external flaps.

Deflection grids may be used instead of external flaps on the lower and/or upper parts of the nacelle in order to prevent interaction with the ground and/or leading edges respectively and/or disturbance to lift.

Another subject of the present invention is an aircraft which includes at least one nacelle which is in accordance with one of the preceding claims.

BRIEF DESCRIPTION OF THE DIAGRAMS

The present invention will be more clearly understood with the help of the following description and the appended diagrams, in which.

DETAILED DESCRIPTION OF SPECIFIC EMBODIMENTS

Figure 1:
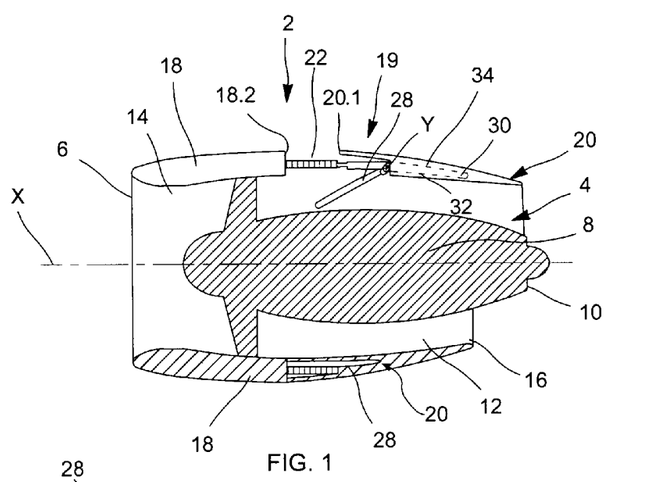
FIG. 1 is a longitudinal section view of one embodiment for a nacelle according to the invention.

In FIG. 1, a schematic section view can be seen of a nacelle 2 of an aircraft according to one embodiment of the present invention along longitudinal axis X, in which an engine unit 4 is arranged.

The nacelle 2 includes at the front an air inlet 6, which divides into a primary duct 8 which passes through the engine unit 4 and emerges through a primary outlet 10 at the rear of the nacelle 2, and into a secondary duct 12 provided behind a fan 14, emerging via a secondary outlet 16. Thus the thrust from the propulsion assembly made up of the nacelle and the engine is the result, in particular, of the discharge of fluid flows emerging from the primary and secondary outlets 10 and 16.

The nacelle 2 is designed to be fixed beneath the wing of an aircraft using a pylon which extends axially under the wing and which connects to the nacelle at an upper zone. For example, the pylon passes through the nacelle cowl and connects onto the engine 4.

The nacelle includes a thrust reverser system 19. In the present request, the term thrust reverser refers to a system which is designed to reduce, cancel or reverse the thrust.

The nacelle 2 includes a fixed part 18 and a moving part 20. In the example shown the fixed part 18 forms the forward part of the cowl of the nacelle and the moving part 20 forms the rear part of the cowl of the nacelle.

In the present request, front/forward and back/rear are defined relative to the axis X, with the front of the nacelle being the end located towards the front of the aircraft in the direction of the flight deck when the nacelle is fitted to a wing of the latter, and the rear being the end located at the rear of the aircraft towards its tail.

The moving part 20 is designed to move axially towards the rear over a restricted distance so that a front end 20.1 of the moving part 20 makes, with a rear end 18.2 of the fixed part 18, a radial opening 22 with an effectively annular shape, when the moving part 20 is in the retracted position. This radial opening 22 forms a part of the thrust reverser system 19.

The moving part 20 is, for example, moved by means of actuator pistons which are very familiar to those working in the field. These are therefore not described in detail.

This radial opening 22 opens onto the secondary duct 12 so as to allow the secondary flow passing through the secondary duct 12 to escape, at least in part, through this radial opening 22.

The thrust reverser system also includes elements 28 designed to enter the secondary duct in order to reduce or interrupt the secondary flow emerging towards the rear end of the nacelle, respectively reducing or cancelling the thrust generated by the secondary flow.

The elements 28 are made up of flaps 28 which move between a folded position, essentially at a tangent to an imaginary circle C of axis X, and a position deployed towards the interior where they enter into the secondary duct 12.

Each flap 28 is fitted so that it can move in rotation around an axis Y which is tangential to an imaginary circle C. The flaps are distributed over the entire periphery of the disk C except at the pylon 26.

Figure 9A:
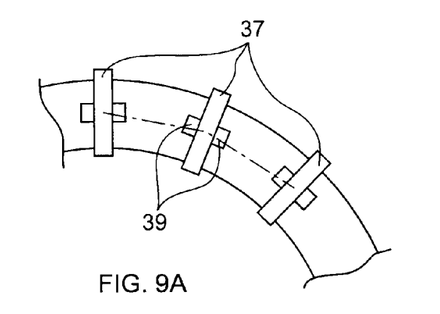
FIG. 9A is a detail view of the face of the chassis on which the flaps are mounted so that they pivot, with the flaps omitted.
Figure 9B:
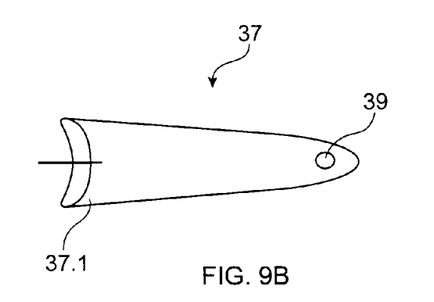
FIG. 9B is a section view of the chassis in FIG. 9A.

The flaps are hinged between two longitudinal arms 37 overhanging towards the rear and flush mounted at their front end 37.1 in the front frame of the inverter as represented in FIGS. 9A and 9B.

The arms 37 each include a shaft 39 which protrudes laterally, on which a lateral end of a flap is mounted so that it pivots.

There are as many arms 37 as there are flaps.

According to the present invention, the moving part 20 of cylindrical shape includes an axial annular housing 30 which is defined between an internal skirt 32 and an external skirt 34. The internal skirt 32 forms the radially external wall of the secondary duct and the external skirt forms the external wall of the nacelle.

According to the present invention, the flaps 28 are, when in the folded position, received in the annular housing 30, thus the flaps and the connecting zones between the flaps are hidden in the moving part 20 and therefore do not define the secondary duct. The radially external surface of the secondary duct 22 is then free of any protrusions and complete noise reduction treatment can be applied to it.

Each internal flap 28, in the example shown, effectively has a trapezoidal shape, mounted so that it pivots along the large base of the trapezoid. This shape, when the flaps are deployed, allows a continuous crown shape to be achieved. The use of flaps of rectangular shape still belongs to the invention.

Figure 6A:
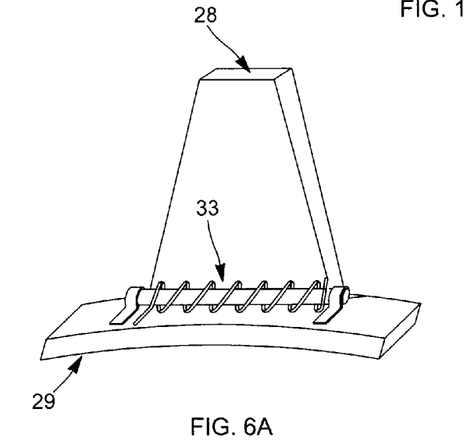
FIG. 6A is a detail view of an example of a hinge of an internal flap according to the present invention.

According to the present invention, and as shown schematically in FIG. 6A, automatic means of opening 33 are provided for each internal flap 28, controlled directly by the movement of the moving part 20. In particular, these means of opening apply a permanent opening force on the internal flaps 28.

These means for opening are, for example, of the "clothespeg spring" type, where the spring is wound around the axis of rotation of each flap, and is supported at each of its ends on the flap and on the chassis in such a way that it exerts an opening force on the flap 28.

In addition, means 35 of limiting the opening of the flaps are provided at each flap to limit the deployment of each flap.

These means 35, which can be seen in FIGS. 2A to 5 which represent another embodiment for the nacelle, include a bushing 38 which is designed to slide around a rod 36, and a rod 40 connected to the bushing 38 and to the flap 28. Thus there are provided as many rods 36 as there are flaps 28. The travel of the bushings 38 along the rods 36 is limited.

The nacelle advantageously includes means for facilitating the relative movement between the moving part 20 and the flaps 28, in particular in order to avoid jamming during forwards movement of the moving part 20 and retraction of the flaps 28.

Figure 7:
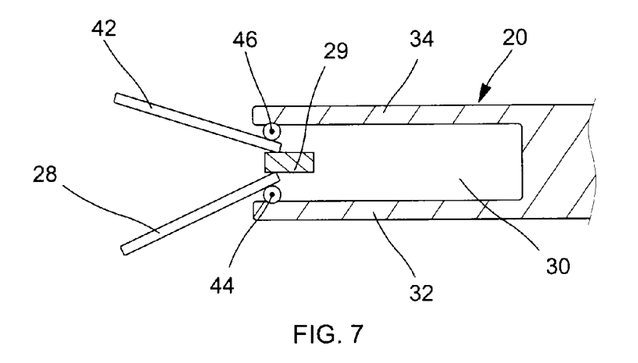
FIG. 7 is a detail view of the engagement between the moving part of the nacelle cowl and the flaps.

In order to do this a number of rollers 44 are provided which can be seen in FIG. 7, which shows a nacelle equipped with internal and external flaps, carried on the moving part 20. The rollers are designed to respectively roll along roller tracks on each of the flaps 28.

Thus when the moving parts slides, each roller rolls in a roller track in a flap, ensuring relative movement without jamming.

In particular the rollers 44 are on the internal skirt 32.

The maximum opening of the flaps can be envisaged as being directly limited by the moving part; in this case no limit stop rod is provided.

It could also be envisaged that rollers are not used, and that deployment actuator pistons are used as limit stop rods, with the actuator pistons acting both as a means of limiting deployment and as a means of operating the flaps. In this variant, deployment occurs in two steps, first of all a movement of the moving cowl, then deployment of the flaps by means of the actuator pistons.

Deflection grids of a known type are also provided at the opening 22 in order to guide the secondary flow that is diverted towards the exterior. These deflection grids are non-movable and are arranged like the flaps 28 when in the at-rest state. When the moving part 20 is in the forward position, they are received into the radial housing 30 of the moving part 20.

According to another embodiment represented in FIGS. 2A to 5, the addition of flaps 42 to the thrust reverser system is provided which are designed to guide the part of the diverted secondary flow forwards in order to reverse the thrust.

These flaps 42 are similar to the flaps 28, but deploy towards the exterior of the nacelle.

The flaps 42 are mounted so that they rotate around an axis effectively at the edge of a circle C on the chassis 29 and once deployed form a crown.

When the external flaps 42 are in the folded position, they are housed in the housing 30.

Figure 6B:
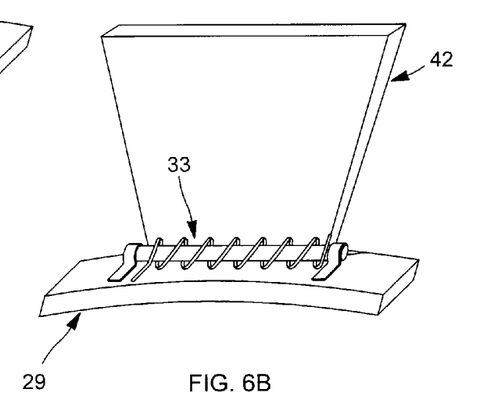
FIG. 6B is a detail view of an example of a hinge of an external flap according to the present invention.

Means for opening, shown in FIG. 6, similar to those of the internal flaps 28 are also provided, which apply a force on the external flaps 42 towards the exterior. These means are advantageously formed of springs rolled around the shafts of the flaps. Control of the external flaps is therefore also achieved directly using the moving part; deployment of the internal flaps 28 and of the external flaps 42 therefore occurs simultaneously.

In an advantageous manner, the means for retention include a second rod connecting the bushing 38 and an external flap 42.

The external flaps 42 advantageously also have a trapezoidal form, mounted so that they are hinged on the chassis 29 by their small base, so that the when flaps are deployed they form a continuous crown.

It is envisaged that the axis of rotation for each of the external flaps is angularly offset in relation to the other axes. The axes of rotation are therefore not contained in one plane which is orthogonal to the axis X, but each axis is in a separate plane intersecting the plane which is orthogonal to the axis X. This angular offset allows the external flaps 42 to retract without interfering with each other.

The angular offset between two axes is, for example, between 5° and 10°.

External flaps which have a rectangular form could also be used; in this case the angular offset is not necessary.

As with the embodiment with internal flaps only, rollers 46 (FIG. 7) are fitted between the moving part 20 and the external flaps 42, in particular on the external skirt.

The safety systems usually used in nacelles may be used in the nacelle according to the present invention. For example there could by hydraulic actuators with hydraulic shear axes.

According to the present invention, opening and closing is therefore directly controlled only through movement of the moving part coming into direct contact with the flaps 28, 42, which simplifies control and makes it more secure, since it is solely mechanical. No moving part movement sensors or fluid introduction controls are therefore required in order to cause deployment to occur. The system is therefore robust.

The operation of the nacelle according to the present invention equipped with internal and external flaps will now be described.

When the thrust reversal system is in the at-rest state (FIGS. 2A and 4), the moving part 20 is in the forward position in contact with the fixed part 18, and there is no radial opening 22. The internal 28 and external 42 flaps are kept folded inside the annular housing 30 of the moving part 20. The internal surface, i.e. the wall radially outside the secondary duct, and the external surface of the nacelle are continuous, allowing a continuous noise reduction treatment to be applied. This contributes to optimised aerodynamic and acoustic characteristics being achieved.

Figure 2A:
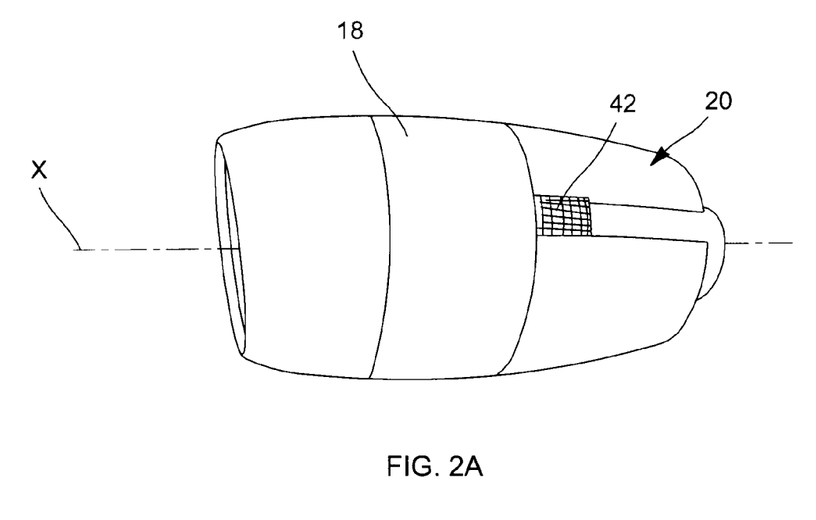
FIG. 2A is a perspective view of a nacelle according to another embodiment according to the invention, where the thrust reverser system is inactive.
Figure 2B:
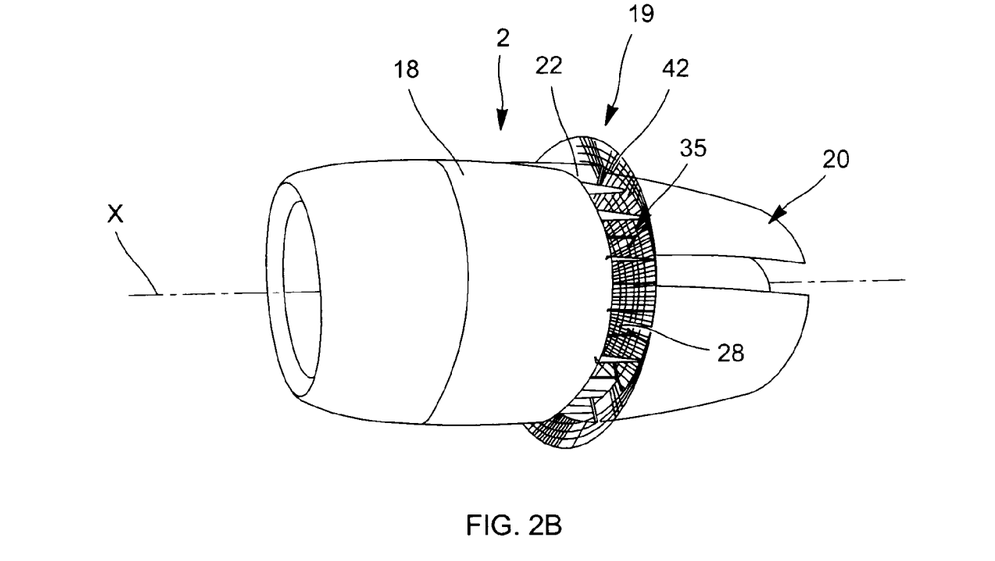
FIG. 2B is a perspective view of a nacelle as in FIG. 2A, where the thrust reverser system is active.
Figure 3:
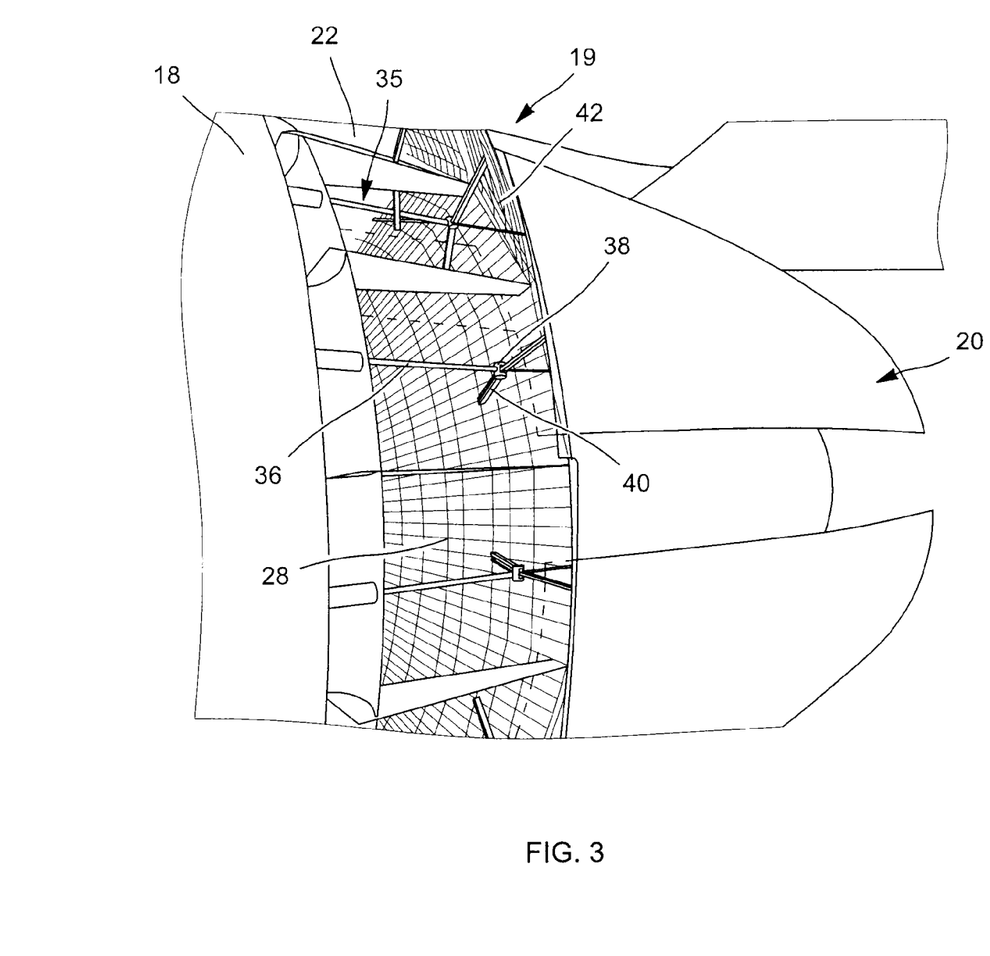
FIG. 3 is an enlarged view of FIG. 2.
Figure 4:
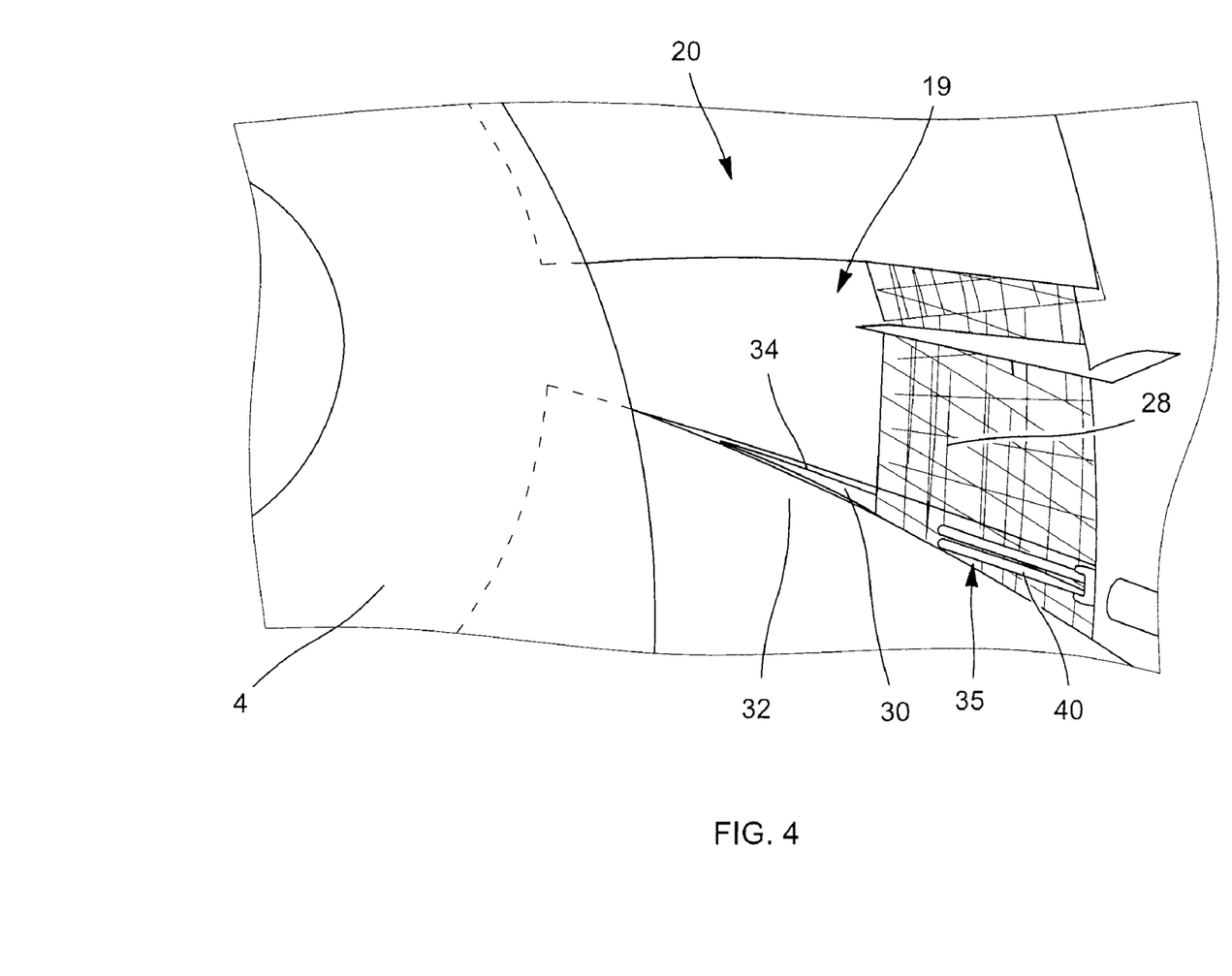
FIG. 4 is a view of the interior of the nacelle in FIG. 2, where the thrust reverser system is inactive.
Figure 5:
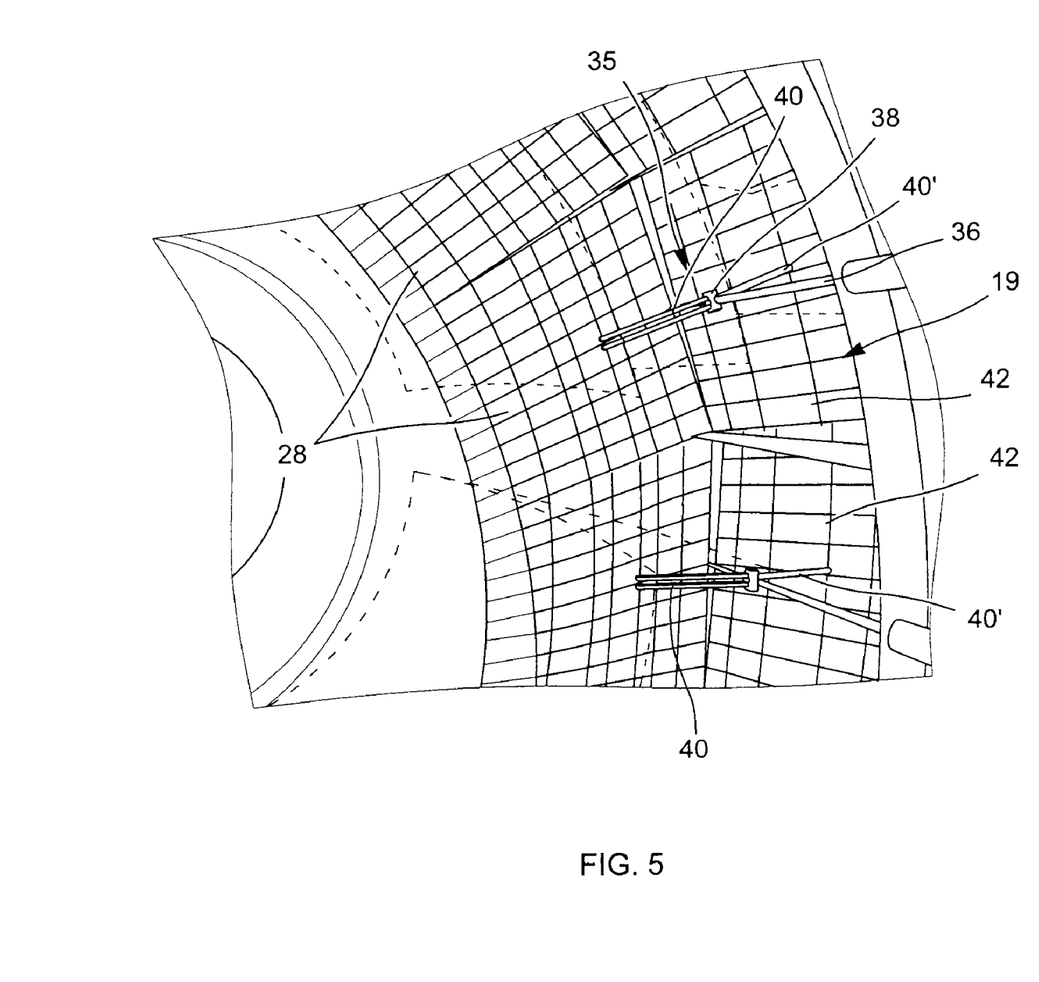
FIG. 5 is a view of the interior of the nacelle as in FIG. 2, where the thrust reverser system is active.

When reverse thrust is required, in particular after the aircraft lands, the means for moving the moving part 20 are operated, and the latter slides backwards. The radial opening 22 is then created and the flaps simultaneously emerge from the housing 30. Under the action of the springs the internal and external flaps automatically deploy and reach their fully deployed position when the moving part 20 reaches its extreme rear position (FIGS. 2B, 3 and 5). In this fully withdrawn position the internal flaps block the secondary flow, at least in part, so that there is maximum performance in reverse thrust mode.

The internal 28 and external 42 flaps therefore start to pivot before the moving part 20 is completely retracted.

The internal flaps 28 then form a crown which protrudes onto the secondary duct 18 and the external flaps 42 form a crown which protrudes from the external wall of the nacelle.

The secondary flow is then partially or completely diverted by the internal flaps 28 and guided forwards by the external flaps 42.

The angle of complete opening of the external flaps is, for example, about 70° relative to the axis X, similarly for the internal flaps 28.

For the return to the at-rest position, all that is required is to send a command to slide the moving part forwards in the direction of closure of the opening 22; the rollers roll on the roller tracks on the internal and external flaps 42, naturally resulting in their being folded back into the annular housing 30 against the means of opening, so that they are loaded ready for the next operation of the means of reverse thrust.

One can envisage part of the external flaps being replaced by deflection grids of a known type.

Some of the external flaps could be replaced by deflection grids in order to optimise the configuration of the means of reverse thrust in the light of installation criteria, in particular in order to avoid interference with the wings, in particular the leading edges located at the upstream side of the wing, or with the ground during landing, with lift, for re-injection and in order to further improve the aerodynamics.

In effect, the air expelled radially towards the ground is reflected from the ground and is "re-swallowed" by the return, which can disrupt the engine. In order to avoid this, deflection grids can be installed which modify the direction in which air is ejected towards the sides. Similarly for the air which is ejected radially upwards, deflection grids are provided so as not to interrupt lift.

These deflection grids are fixed and arranged in a manner identical to the external flaps in the at-rest state, and allow the part of the secondary flow that is diverted to pass without it being guided forwards.

This is the case where all the external flaps are replaced by deflection grids, then only the internal flaps pivot.

The thrust reverser system according to the invention therefore provides simple, robust and secure control, since no means dedicated solely to the operation of the flaps are required. In effect, control of the moving part of the nacelle directly controls the operation of the flaps. Furthermore it enables aerodynamic and acoustic performance to be improved by creating continuous surfaces with fewer protrusions.

Figure 8:
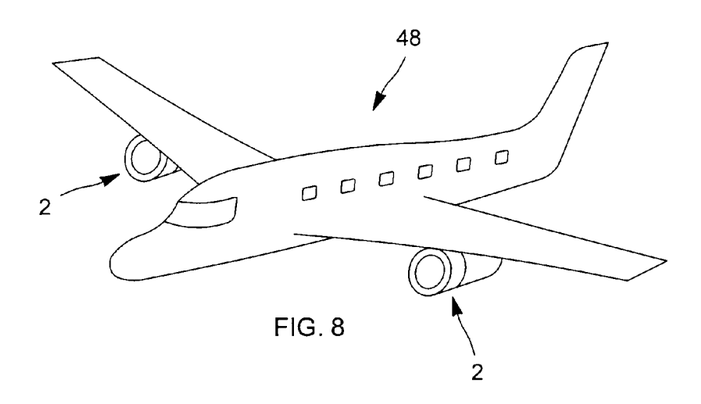
FIG. 8 is schematic perspective view of an aircraft equipped with nacelles according to the present invention.

FIG. 8 shows an aircraft 48 equipped with two nacelles 2 according to the present invention.

The invention claimed is:

1. An aircraft nacelle which includes:
a cowl with a longitudinal axis,
an engine housed in the internal space defined by the cowl,
an annular channel surrounding the engine and which is designed to receive a secondary flow, the cowl being made up of a fixed part and a moving part designed to slide along the longitudinal axis in order to define a radial opening between the moving part and the fixed part,
a thrust reverser system which includes internal flaps fitted so that they rotate and designed to have an at-rest position in which the internal flaps are effectively parallel to the longitudinal axis and a deployed position in which the internal flaps obstruct, at least partially, the annular channel,
the moving part of the cowl including a radial housing which extends longitudinally to receive the internal flaps in the at rest position,
a system designed to apply an elastic force to each internal flap towards a deployed position, so that control over the position of the internal flaps is achieved directly by sliding the moving part of the cowl,
maximum deployment limiters equipping the thrust reverser system, said limiters including a bushing which can move along a rod which extends longitudinally from the fixed part of the cowl across the radial opening and a rod which connects the bushing to the internal flap.

2. Nacelle for an aircraft according to claim 1, wherein the system for applying elastic force includes a spring coiled around an axis of rotation of the internal flaps and supported at each of its ends on the internal flap and on a chassis.

3. Nacelle for an aircraft according to claim 1, wherein the thrust reverser system also includes external deflection flaps at the external circumference of the nacelle, said external deflection flaps fitting into the radial housing in the at rest position of the internal flaps.

4. Nacelle for an aircraft according to claim 1, wherein the thrust reverser system also includes external deflection grids at the external circumference of the nacelle, said external deflection grids fitting into the radial housing in the at rest position of the internal flaps.

5. Nacelle for an aircraft according to claim 3, wherein the system for applying an elastic force in deployment for each external flap are provided so that the control over the position of the external flaps is achieved directly by sliding the moving part of the cowl and is simultaneous with that of the internal flaps.

6. Nacelle for an aircraft according to claim 3, wherein the external flaps are trapezoidal in shape, and are fitted so that they rotate along their small base, the axes of rotation of each of the external flaps being angularly offset relative to each other so that the axes of rotation are not in a plane that is orthogonal to the longitudinal axis.

7. Nacelle for an aircraft according to claim 5, wherein the external flaps are trapezoidal in shape, and are fitted so that they rotate along their small base, the axes of rotation of each of the external flaps being angularly offset relative to each other so that the axes of rotation are not in a plane that is orthogonal to the longitudinal axis.

8. Nacelle for an aircraft according to claim 1, wherein the maximum deployment limiters for each internal flap include a second rod linking a bushing to an external flap.

9. Nacelle for an aircraft according to claim 1, wherein a first set of rollers is provided on the moving part, designed to roll in roller tracks formed in the internal flaps.

10. Nacelle for an aircraft according to claim 1, wherein the thrust reverser system also includes external deflection flaps at the external circumference of the nacelle, said external deflection flaps fitting into the radial housing in the at rest position of the internal flaps, a set of rollers designed to roll on roller tracks formed in the external flaps is provided.

11. Nacelle for an aircraft according to claim 9, wherein the thrust reverser system also includes external deflection flaps at the external circumference of the nacelle, said external deflection flaps fitting into the radial housing in the at rest position of the internal flaps, a second set of rollers designed to roll on roller tracks formed in the external flaps is provided.

12. Nacelle for an aircraft according to claim 1, wherein the thrust reverser system also includes deflection grids at the external circumference of the nacelle, said deflection grids fitting into the radial housing in the at rest position of the internal flaps, the deflection grids provided on lower or upper parts of the nacelle.

13. Aircraft which includes at least one nacelle which includes a nacelle with:
- a cowl with a longitudinal axis,
- an engine housed in the internal space defined by the cowl,
- an annular channel surrounding the engine and which is designed to receive a secondary flow, the cowl being made up of a fixed part and a moving part designed to slide along the longitudinal axis in order to define a radial opening between the moving part and the fixed part,
- a thrust reverser system which includes internal flaps fitted so that they rotate and designed to have an at-rest position in which the internal flaps are effectively parallel to the longitudinal axis and a deployed position in which the internal flaps obstruct, at least partially, the annular channel,
- the moving part of the cowl including a radial housing which extends longitudinally to receive the internal flaps in the at rest position,
- a system designed to apply an elastic force to each internal flap towards a deployed position, so that control over the position of the internal flaps is achieved directly by sliding the moving part of the cowl,
- maximum deployment limiters equipping the thrust reverser system, said limiters including a bushing which can move along a rod which extends longitudinally from the fixed part of the cowl across the radial opening and a rod which connects the bushing to the internal flap.

* * * * *